July 28, 1936.    H. MARLES    2,048,803
UNIVERSAL JOINT FOR TIE RODS
Filed Dec. 24, 1934
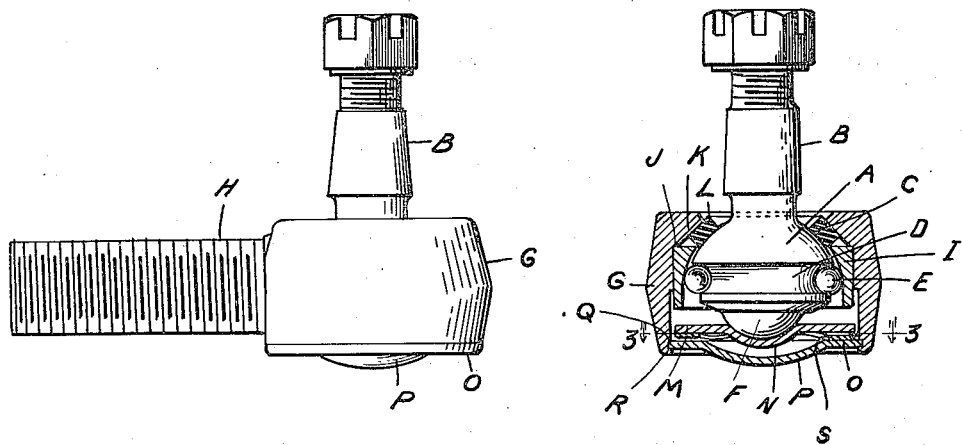
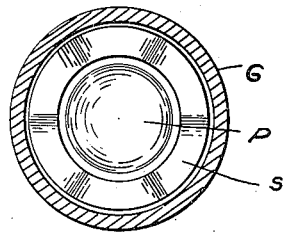
INVENTOR
HENRY MARLES
BY
ATTORNEYS Patented July 28, 1936

2,048,803

UNITED STATES PATENT OFFICE 2,048,803

UNIVERSAL JOINT FOR TIE RODS

Henry Marles, Detroit, Mich., assignor to Gemmer Manufacturing Company, Detroit, Mich., a corporation of Michigan Application December 24, 1934, Serial No. 759,108

1 Claim. (Cl. 287—90)

The invention relates to universal joints and more particularly to constructions of the type used in motor vehicle steering mechanisms for connecting the rock arm with the tie rod. It is the object of the invention to obtain a construction which will automatically compensate for wear, is low in frictional resistance and is maintained properly lubricated. It is a further object to obtain a simple construction to manufacture and to assemble. With these objects in view the invention consists in the construction as hereinafter set forth.

Fig. 1 is a side elevation of my improved universal joint as arranged between the tie rod and rock arm of a steering mechanism;

Fig. 2 is a cross section partly in elevation;

Fig. 3 is a section on line 3—3 of Fig. 2 showing the resilient member for compensating for wear.

As illustrated, A is the male member of the universal joint which is formed integral with the shank B by means of which it may be attached to the rock arm of the steering mechanism. The member A has a segmental spherical portion C merging into the shank B and provided in the plane of its equator perpendicular to the axis of said shank with an annular groove D for receiving a series of balls E. On the opposite side of this groove is a segmental spherical portion F which is of a radius less than the radius of the portion C but concentric therewith. G is the female member of the joint which as shown is formed integral with a threaded shank H for attachment of the same with the tie rod (not shown). This member G has a cylindrical recess therein in which is placed an annular race member I for engagement with the balls E. The race member has a portion on one side of the equatorial plane which is of a segmental spherical form of slightly larger radius than the portion C, while the portion on the opposite sides of this plane is cylindrical. The race member I engages a shoulder J at the inner end of the cylindrical recess and beyond this shoulder is a beveled or conical portion K forming a seat for a resilient sealing gasket L which engages the spherical portion C. To retain these members in engagement and to also compensate for wear, I have provided a disk member M fitting in the cylindrical recess and provided centrally with the spherical portion N forming a socket for engaging the spherical portion F. O is a disk-shaped cap member having a segmental spherical central portion P providing clearance for the portion N of the disk M. The cap O engages a shoulder Q formed by a counter sunk end portion of the cylindrical recess in the member G and is retained by a peened over portion R. Between the cap O and the disk M is an annular resilient washer S which is corrugated or otherwise fashioned to form a cushion. Thus after the parts are assembled and the cap member O is secured by the peened flange R, the corrugated resilient washer S will be placed under tension which will hold the balls in engagement with the spherical portion of the race E, taking up all lost motion. Also by reason of this tension, there will be automatic take-up in case of wear. The space within the member G may be packed with lubricant which is retained from leaking out by the resilient gasket L.

With the construction as described, in operation the balls E form an anti-friction bearing for all relative rotary movement around the axis of the male member, while the segmental portion F will have sliding engagement with the segmental socket N in the washer O. By reason of the fact that the radius of this segmenta portion is considerably less than the radius of the race member I, the friction between these relative sliding members will not be excessive. Also, the reduction in radius of the portion F decreases the corresponding dimension of the member G.

What I claim as my invention is:

In a universal joint, the combination with a female member having a cylindrical recess therein, and an annular race member in said recess provided with a segmental spherical bearing surface on one side of its equatorial plane, a male member engaging said recess provided with a segmental spherical portion for fitting within the segmental spherical portion of said race member, being also provided with an annular groove in the equatorial plane thereof and a spherical segment of lesser radius on the opposite sides of said plane, balls in said annular groove for engaging said race member, a cap for closing said cylindrical recess and a bearing inside said cap having an annular portion parallel thereto and a segmental spherical central portion for engaging said spherical segment of lesser radius, a resilient annular washer interposed between said cap and the annular portion of said bearing for taking up lost motion and providing automatic adjustment for wear, a resilient gasket engaging the first mentioned segmental spherical portion on said male member, and a beveled annular bearing on said female member forming a seat for said gasket.

HENRY MARLES.